(12) United States Patent
Poggio

(10) Patent No.: US 12,438,207 B2
(45) Date of Patent: Oct. 7, 2025

(54) CONTROL UNIT, VEHICULAR BATTERY PACK AND RELATIVE ASSEMBLY METHOD

(71) Applicant: FERRARI S.p.A., Modena (IT)

(72) Inventor: Luca Poggio, Modena (IT)

(73) Assignee: FERRARI S.P.A., Modena (IT)

( * ) Notice: Subject to any disclaimer, the term of this patent is extended or adjusted under 35 U.S.C. 154(b) by 783 days.

(21) Appl. No.: 17/738,059

(22) Filed: May 6, 2022

(65) Prior Publication Data

US 2022/0367930 A1 Nov. 17, 2022

(30) Foreign Application Priority Data

May 17, 2021 (IT) .................. 102021000012632

(51) Int. Cl.
*H01M 10/48* (2006.01)
*H01M 50/505* (2021.01)

(52) U.S. Cl.
CPC ....... *H01M 10/482* (2013.01); *H01M 10/486* (2013.01); *H01M 50/505* (2021.01); *H01M 2220/20* (2013.01)

(58) Field of Classification Search
CPC . H01M 10/613; H01M 10/482; H01M 10/486
See application file for complete search history.

(56) References Cited

U.S. PATENT DOCUMENTS

| 2015/0069829 | A1 | 3/2015 | Dulle et al. |
| 2015/0140380 | A1 | 5/2015 | Kang et al. |
| 2018/0047968 | A1 | 2/2018 | Ota et al. |
| 2019/0165408 | A1 | 5/2019 | Andryukov et al. |

FOREIGN PATENT DOCUMENTS

| CN | 111987248 A | 11/2020 |
| DE | 102009043858 A1 | 3/2010 |
| EP | 3731300 A1 | 10/2020 |
| WO | 2015198008 A1 | 12/2015 |

OTHER PUBLICATIONS

Italian Search Report for Application No. 102021000012632, completed Dec. 16, 2021, 13 pages.

*Primary Examiner* — Sarah A. Slifka
(74) *Attorney, Agent, or Firm* — CANTOR COLBURN LLP

(57) ABSTRACT

Control unit for a vehicle battery pack comprising at least one module provided with a plurality of electrochemical cells carried on board a support structure; the control unit comprising a planar support substrate made of an at least partially insulating material; a plurality of sensor elements; wherein the sensors elements are arranged, on the support substrate, in two rows so as to be each positioned, once the unit is installed on board the vehicle battery pack, in the area of a respective terminal pole of each electrochemical cell; wherein the sensor elements comprise at least one voltage sensing device, which comprises at least two conductor and elastically deformable contact element, which are configured to be elastically compressed between the planar support substrate and the respective terminal pole.

14 Claims, 13 Drawing Sheets

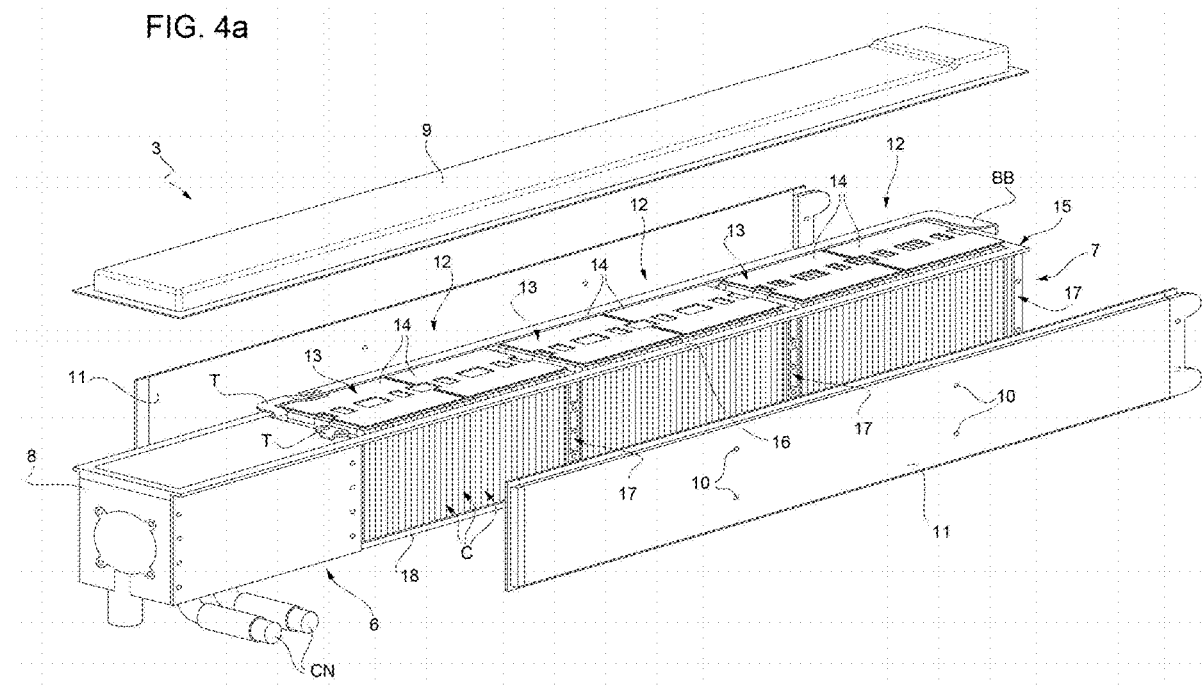

CONTROL UNIT, VEHICULAR BATTERY PACK AND RELATIVE ASSEMBLY METHOD

CROSS-REFERENCE TO RELATED APPLICATIONS

This patent application claims priority from Italian patent application no. 102021000012632 filed on May 17, 2021, the entire disclosure of which is incorporated herein by reference.

TECHNICAL FIELD

The invention relates to power storage systems for the automotive industry and, in particular, it relates to a control unit, to a vehicle battery pack and to a relative assembling method.

PRIOR ART

Lithium batteries, thanks to their high energy density, allow electric drive systems to be more and more implemented in the automotive industry. Lithium polymers, in particular, currently represent, from a chemical point of view, the state of the art in the production of high-capacity batteries.

Solutions are known, which involve the interconnection—in series and in parallel—of different cells (generally, with 3.7 V each) in order to reach the desired total voltage and energy density for a vehicle battery pack.

The battery modules currently available in the market (not only in the automotive industry, but also in consumer electronics) often consist of planar pouch batteries, which have a much more limited thickness compared to the other dimensions. There are two very large opposite faces (through which heat is dissipated almost entirely) and four elongated narrow sides, wherein the positive and negative terminals of the cells are arranged on one side or on two opposite sides.

In detail, a known power storage system for an electric drive vehicle comprises a battery pack consisting of a plurality of battery modules electrically connected to one another. Each battery module comprises, in turn, a large support structure, which carries a plurality of electrochemical cells electrically connected to one another in series and/or in parallel.

A known power storage system further comprises an electrical connector to connect the power storage system to the drive system of the electric drive vehicle as well as a control unit (normally called BMS—"Battery Management System"), which interacts with all battery modules in order to control and manage each cell or sets of electrochemical cells of each battery module.

Alternatively, each battery module has a respective BMS connected to a further control unit in a centralised manner. In detail, each electrochemical cell has a positive pole at an end and a negative pole at an opposite end (or at the same end) and the control unit (namely, the BMS) is connected to each pole of the electrochemical cell to control the voltage values of each electrochemical cell.

Generally, the connection of the poles of the single electrochemical cells to the control unit takes place through a plurality of multicore electrical cables.

Each battery modules further comprises two temperature sensors, which are connected to the control unit through a corresponding electrical cable in order to transmit, to the control unit, a measure of the inner temperature of the modules (usually) in a couple of different zones.

Usually, in order to avoid inconvenient phenomena commonly known as "gassing", namely formation of gas inside the single cells due, for example, to the oxidation of the electrolyte or to the chemical decomposition thereof (often increased by phenomena such as cell overheating or overload), the cell are maintained in a constant compression state. According to the prior art, this compression is provided by the support structure of each battery module, which is configured to compress the cells perpendicularly to the large opposite faces. This compression is provided, for example, by stiffening the support structure and by making sure that at least two lateral walls acts as tie rods in the compression. As a consequence, each battery module usually is pre-assembled and subsequently installed in a further support structure integral to a portion of the frame of the vehicle, so as to hold the different modules in position without jeopardizing the mutual connection thereof.

However, this does not lead, especially in high-performance vehicles such as sports car, to an increase in the mass and in the spaces needed for the storage system, namely for the battery pack. Furthermore, pre-assembling times for each battery module have to be added to the normal installation of the battery modules on board the vehicle.

Moreover, owing to the above, it is also clear that known power storage systems have a plurality of electrical cables connecting the single electrochemical cells to the control unit and extending inside the storage system. The presence of this plurality of electrical cables complicates the structure and the assembly of the power storage system, leads to an increase in volumes, dimensions and weights of the power storage system and risks jeopardizing the safety of the power storage system, especially if we think that between the cable connecting the initial electrochemical cells of the battery pack and the cables connecting the final electrochemical cells of the battery pack there can be a significant voltage difference, even in the range of several hundreds of Volts.

DESCRIPTION OF THE INVENTION

The object of the invention is to provide a control unit, a vehicular battery pack and a relative assembly method, which are at least partially free from the drawbacks described above and, at the same time, are simple and economic to be manufactured and carried out.

According to the invention, there are provided a control unit, a vehicular battery pack and a relative assembly method according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein:

FIGS. 4 and 4a are, respectively, two schematic exploded views of the battery pack of FIG. 1;

PREFERRED EMBODIMENTS OF THE INVENTION

Figure 1:
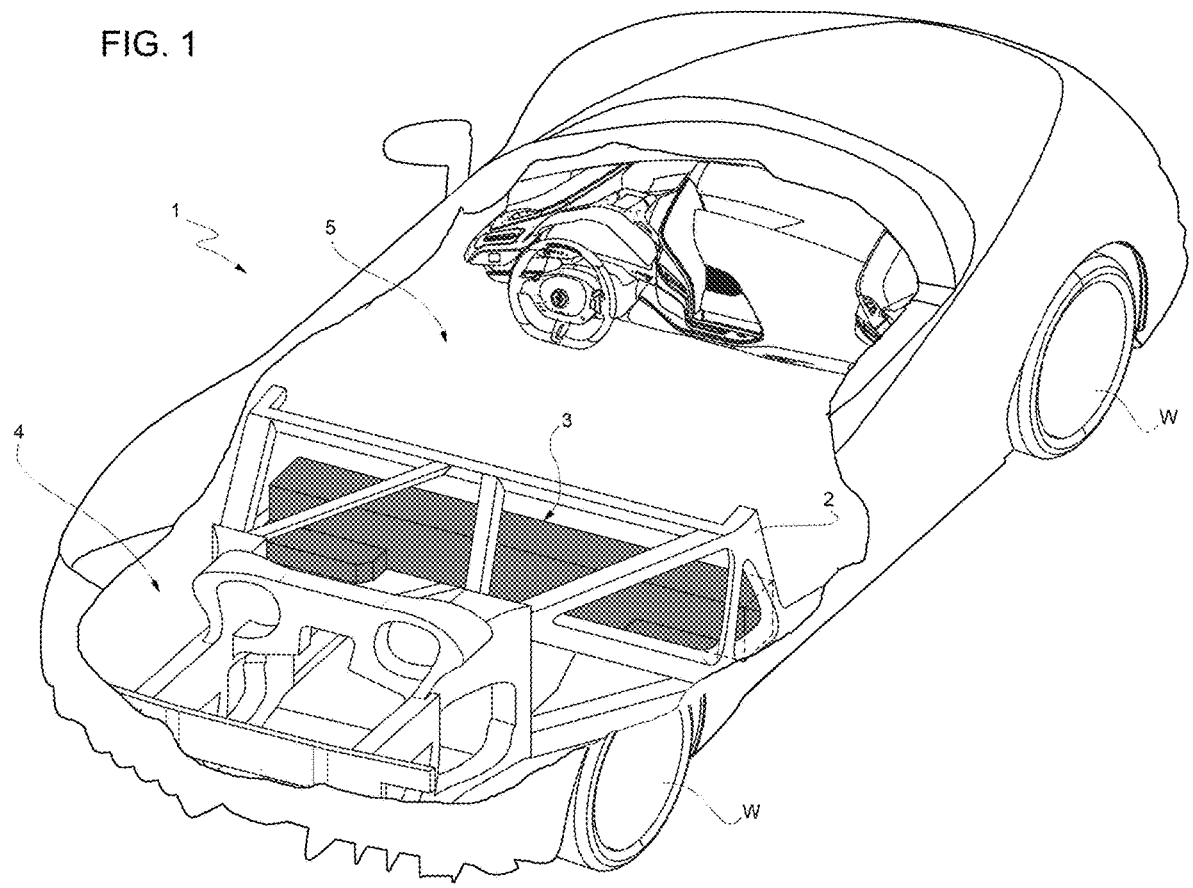
FIG. 1 is a schematic perspective view of an electric drive vehicle comprising a battery pack according to the invention.

In FIG. 1, number 1 indicates, as a whole, a road vehicle provided with two front wheels W and with two rear wheels W. The road vehicle 1 is an at least partially electric vehicle and is provided with a frame 2.

The road vehicle 1 comprises a battery pack 3 supported by (mounted on) the frame 2. In particular, the battery pack 3 is arranged inside an engine compartment 4.

More in particular, the battery pack is arranged at the back of a passenger compartment 5, for example in the area of a vehicle floor, behind the seats contained inside the passenger compartment 5.

Figure 2:
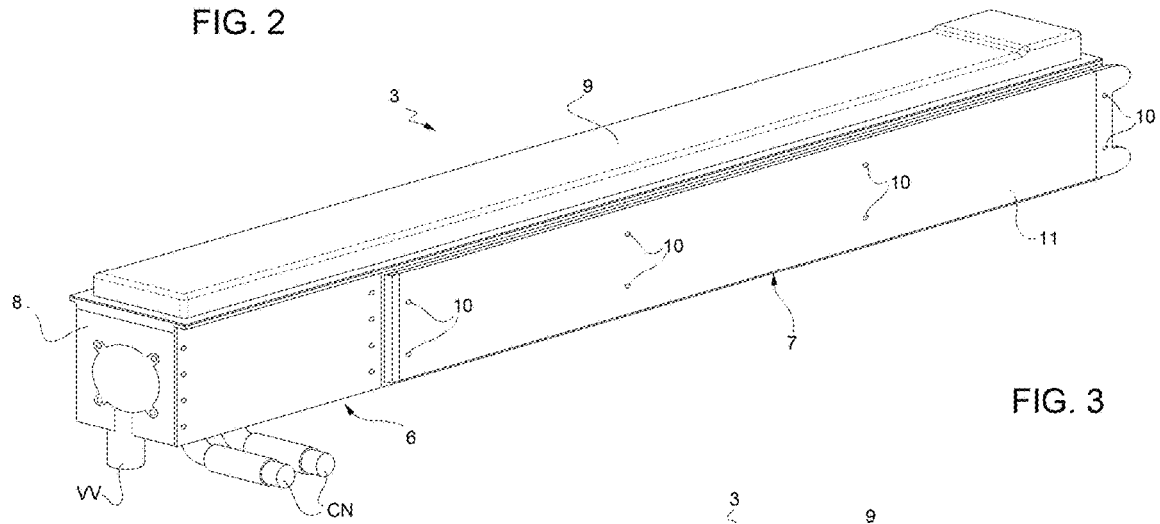
FIG. 2 is a schematic perspective view of a battery pack for an electric drive vehicle according to the invention.
Figure 3:
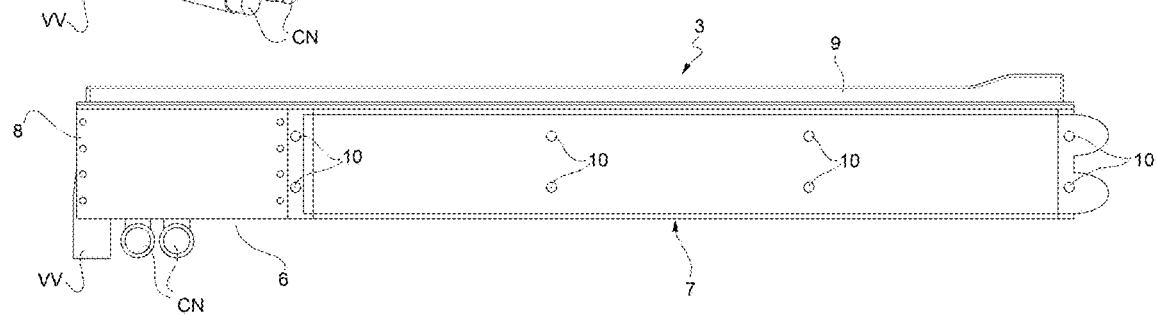
FIG. 3 is a schematic front view of the battery pack of FIG. 1.

Advantageously, though not necessarily and according to FIGS. 1 to 3, the battery pack 3 has an elongated shape (substantially the shape of a parallelepiped) and is arranged crosswise to a longitudinal axis of the vehicle (namely, crosswise, in particular perpendicularly, to the driving direction). In this way, the space inside the engine compartment is optimized, also in relation to the arrangement of the weight.

In particular, the battery pack 3 is suited to be connected to 1 a drive system (which is not shown herein) of the at least partially electric vehicle and is designed to store the power produced by an electric machine (which is not shown herein). The battery pack 3 is connected to the electric machine through the interposition of a power converter (commonly known as inverter), which, based on the different needs of the electric machine and of the battery pack 3, transforms the direct current outputted by the battery pack 3 into alternating current for the electric machine and vice versa.

Figure 4:
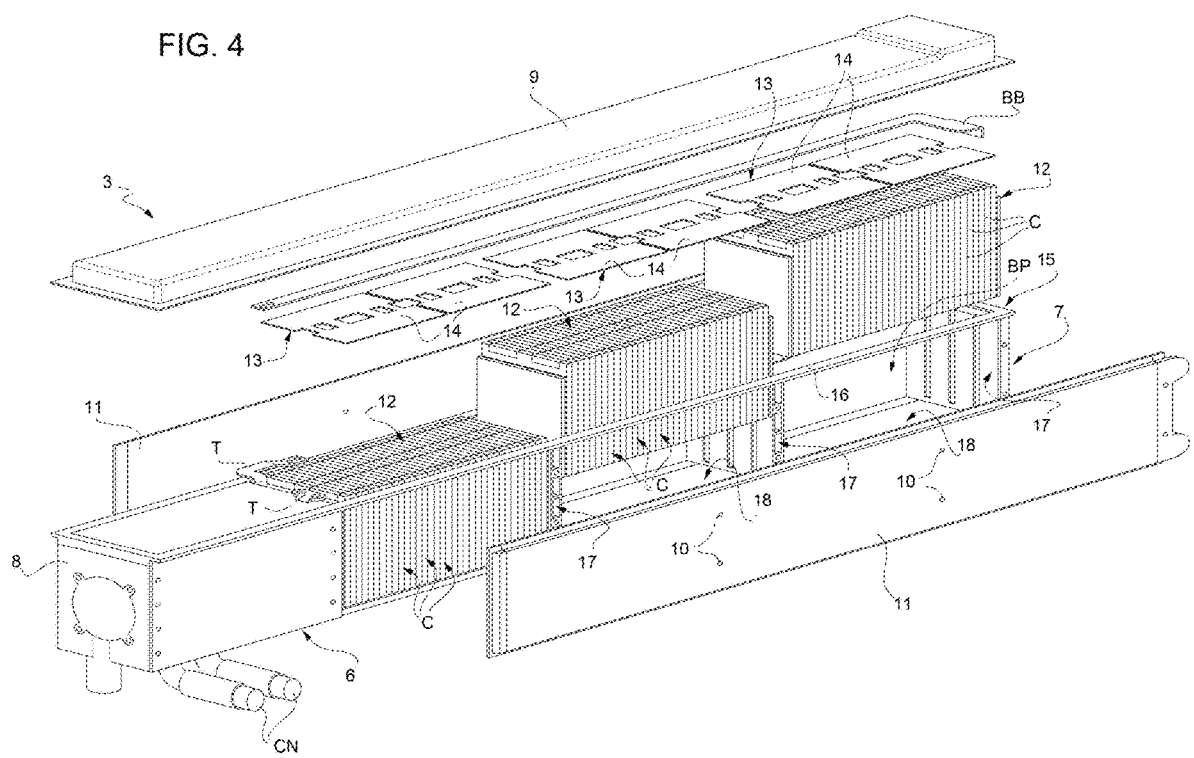

According to the non-limiting embodiments of FIGS. 2 to 4*a*, the battery pack 3 comprises at least section 6 configured to house the battery management system 8 (also referred to as BMS), which is designed to control the operating parameters of the electrochemical cells C (shown, for instance, in FIG. 4). The ends of the cells C contained in the battery pack 3 are connected to terminals T (FIG. 4), which are arranged in the area of the section 6, through a BUS connection.

Two connectors CN project out of the control system 8 and are configured to allow current to flow from and to the control system 8.

According to the non-limiting embodiments of FIGS. 2 to 4*a*, the battery pack 3 further comprises a section 7 configured to house the electrochemical cells, (namely) the active material of the battery pack 3.

Advantageously and according, for example, to FIGS. 4 and 4*a*, the vehicle battery pack 3 comprises a support structure 15 comprising, in turn, at least to elongated perimeter elements 16 and 18, which face one another and define, between them, a box portion BP (FIG. 4).

In particular, in the non-limiting embodiments of FIGS. 4 and 4*a*, the perimeter elements are a frame 16 and a base 18. In other embodiments, they can be two frames facing one another, tubular elements, . . . .

The battery pack 3 further comprises one or more bulkheads 17 arranged so as to divide the box portion BP by delimiting at least two housings, wherein the bulkheads 17 are arranged transversely to the two perimeter elements 16 and 18 facing one another. In other words, the frame 16 and the base 18 define two parallel planes, between which the bulkheads 17 extend crosswise (perpendicularly). In the non-limiting embodiment of FIGS. 4 and 4*a*, the bulkheads 17 delimit, inside the box portion BP, three different housings.

In particular, the battery pack 3 comprises a plurality of modules 12, which comprise, in turn, a plurality of planar electrochemical cells C, which are electrically connected and parallel both to one another and to the bulkheads 17 and are divided into at least two modules 12, in particular one module 12 for each housing. Therefore, in the non-limiting embodiment of FIGS. 4 and 4*a*, there are three modules 12. In the other embodiments, there are two or more than three modules 12, if necessary arranged differently (for example, with a T, an L or a cross arrangement).

Advantageously, the modules 12 each comprise, furthermore, at least two insertion plates 32 arranged at the ends of each module 12, parallel to the bulkheads 17, and configured to facilitate the insertion of each module 12 in compression into the relative housing, so that the compression remains even after the insertion. In this way, the modules 12 of the cells C are compressed on the outside of the housing and inserted into the latter keeping the compression. By so doing, the cells C remain compressed between the two bulkheads 17 delimiting the respective housing.

In particular, the insertion plates 32, once the insertion of the module 12 into the respective housing is complete, act as compression plates (meaning "functional compression", as discussed more in detail below) for the cells C of the relative module 12. In detail, the insertion plates 32 remain interposed between each bulkhead 17 and the first or last cell C of a module 12.

Advantageously, though not necessarily, each insertion plate 32 is in contact with a respective bulkhead 17. In particular, the coefficient of static sliding friction between each plate 32 and the respective bulkhead 17 is smaller than 0.3, preferably smaller than 0.1. In this way, the small friction between the insertion plate 32 and the bulkhead 17 allows each module 12 to slide into the respective housing, despite the compression reaction force exerted by the compressed cells (which, in other words, tend to re-expand).

The insertion plates 32 can be considered as "dispensable" elements, namely left inside the battery pack even though they are not made of active materials. However, advantageously though not necessarily, the insertion plates are also configured to adjust the compression of the module 12 within the housing, compensating for any inaccuracies in the thickness of the plurality of cells C. In particular, the insertion plates 32 have different thicknesses. In this way, it is possible to ensure the achievement and the preservation of a desired compression of the batteries (depending on the number of cells and on their size) making up for possible production tolerances.

Advantageously, though not necessarily, the insertion plates 32 mainly comprise (namely, are made of) polytetrafluoroethylene.

According to the non-limiting embodiment of FIGS. 4 and 4a and, as pointed out, 6-10, each insertion plate 32 and respective bulkhead 17 comprise guiding elements 34, 36 configured to direct the module 12 during the insertion into the respective housing, avoiding undesired rotations. In particular, the guiding elements are complementary elements with a shape coupling, more in particular a skate 34 and at least one respective seat 35 (or rail).

In the non-limiting embodiment of the accompanying figures, each bulkhead comprises, for each surface in contact with a respective insertion plate 32, three parallel seats 35, which house three corresponding parallel sakes 34 obtained on the respective insertion plate 32.

According to the non-limiting embodiment of FIGS. 5-9, the battery pack 3 comprises a plurality of dissipating elements 20 arranged between the cells C, C', C" and configured to transfer heat towards at least one lateral surface LS of the box portion, in particular towards two opposite lateral surfaces LS.

In particular, each dissipating element 20 comprises at least one projecting portion 21, which, together with the ones of the other dissipating elements 20, defines the lateral surface LS. In detail, according to the non-limiting embodiment of the accompanying figures, each dissipating element 20 comprises two opposite projecting portions 21, in particular parallel to one another, which, together with the ones of the other dissipating elements 20, define the two opposite lateral surface LS.

Advantageously, though not necessarily and according to the non-limiting embodiment of FIGS. 5-9, each module 12 comprises a plurality of energy units 19 arranged parallel to one another and enclosed between two insertion plates 32.

Figure 5:
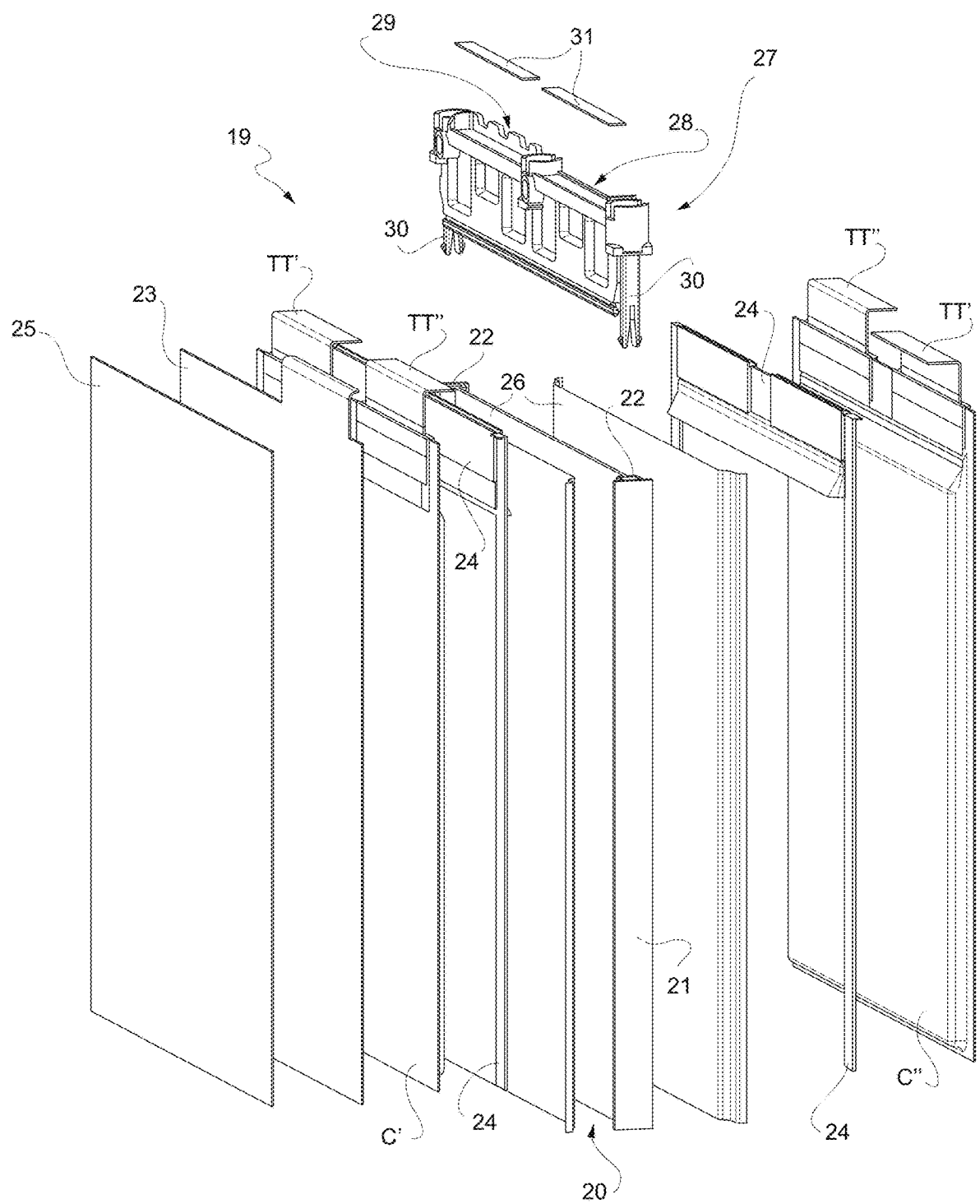
FIG. 5 is a schematic perspective and exploded view of a portion of the battery pack of FIG. 1.

In the non-limiting embodiment of FIG. 5, the unit 19 comprises two planar pouch cells C' and C", between which the dissipating element 20 is inserted.

Each cell C', C" comprises a pair or terminal poles TT', TT" (positive and negative poles, namely cathode and anode) extending on the same side of the cells C', C".

In other non-limiting cases, the terminal poles TT', TT" are arranged on opposite sides of the cells C', C".

In particular, the dissipating element 20 comprises a main (metal) plate parallel to the main surfaces of the cells C' and C" and the projecting portions 21 on opposite sides of the unit 19, in detail on opposite sides where there are not the terminal poles TT', TT".

Preferably, the projecting portions 21 comprise a surface perpendicular to the main plate. In other words, the cross section of the dissipating element 20 is H-shaped.

Advantageously, the cells C' and C" of a same unit 19 are connected in series, the units 19 of a same module 12 are connected in series and the different modules 12 are also connected in series.

According to the non-limiting embodiment of FIG. 5, the unit 19 further comprises a layer 23 comprising (made of) a compensation foam parallel to the cells C', C" and preferably with the same dimensions. In this way, it is possible to compensate for a possible expansion of the cells C', C" during the charging and discharging cycles. In particular, said foam layer 23 is arranged in the unit 19, on the outside of the cell C'.

Advantageously, though not necessarily, according to the non-limiting embodiment of FIG. 5, the unit 19 comprises, for each cell C', C", a peripheral thermal protection 24 configured to protect the edges of the cell C', C" and the relative terminal poles TT', TT", conveying the heat generated by the cell towards the dissipating element 20. In particular, each peripheral protection comprises (is made of) a polyimide film, preferably Kapton. More precisely, the thermal protections 24 are arranged between the dissipating element 20 and the cells C', C".

Preferably, the main plate of the dissipating element 20 has two flat faces, against which a protective film layer 26 (in detail, made of isofoil) rests. In addition, the unit 19 further comprises a further protective layer between two adjacent units 19, namely a separation film 26 (also made of isofoil).

Advantageously, though not necessarily, the unit 19 further comprises a plastic material support 27 configured to support the terminal poles TT', TT" and on which they are connected in series. In particular, in case of the first cell C', both terminal poles TT', TT", are bent in the same direction, whereas, in case of intermediate cells C", the terminal poles TT', TT" are bent with an S shape, so as to connect each intermediate cell C" both to the preceding and to the following cell. In case a connection series has to be created, the support 27 has a passage 28, which permits an interconnection between the cells C', C". On the contrary, the support 27 has a separation 29, which prevents the poles of the two adjacent cells C', C" from coming into contact.

Preferably, the support 27 has fixing means 30, which allow said support to be fixed to channels 22 obtained on the dissipating element 20.

In particular, the unit 19 further comprises one or more connection plates 31 configured to connect and protect the connection between two terminal poles TT', TT"

Figure 6:
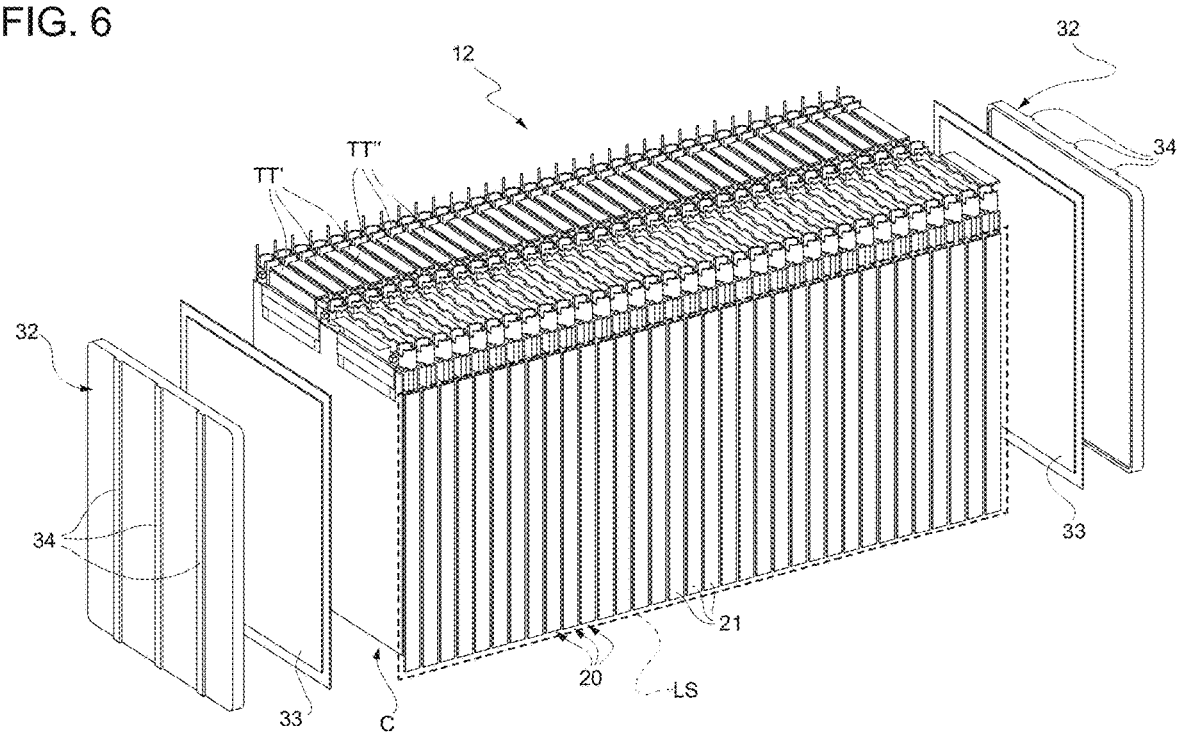
FIG. 6 is a schematic perspective and partially exploded view of a module of the battery pack of FIGS. 4 and 4*a*.
Figure 7:
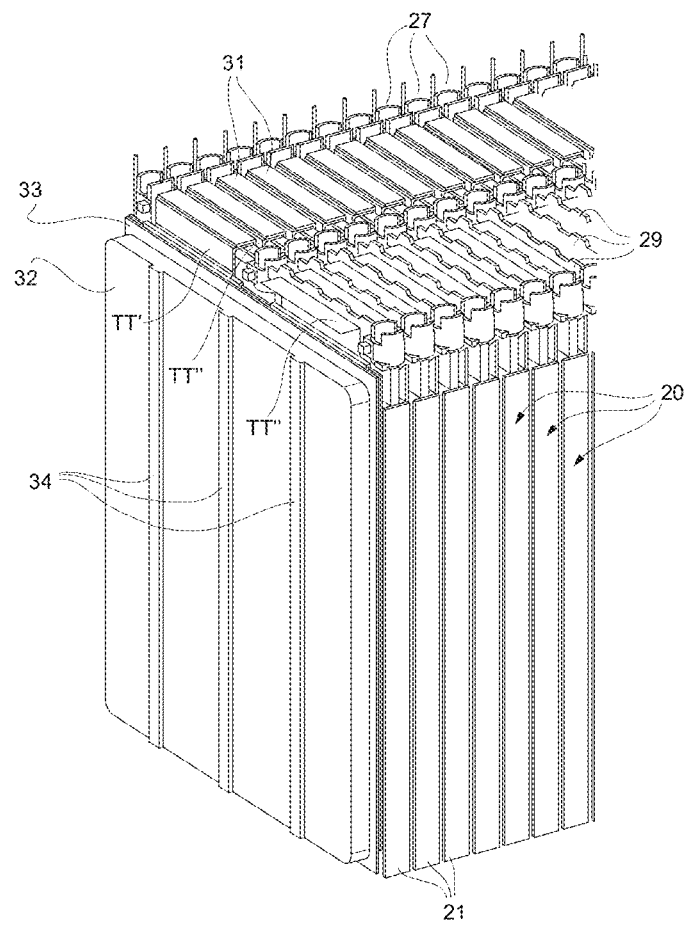
FIG. 7 is a non-exploded detail of the module of FIG. 6.
Figure 8:
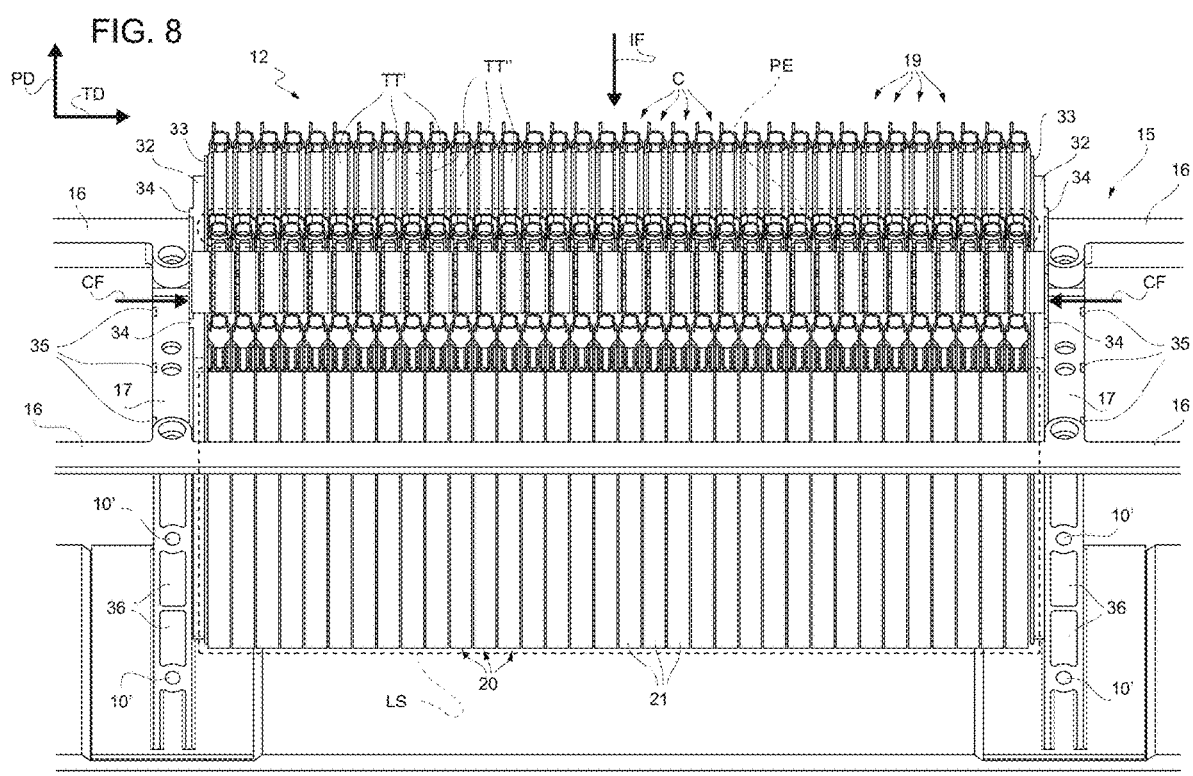
FIG. 8 is a schematic lateral view of a portion of battery pack of FIG. 4 showing the module of FIG. 6 during the insertion into a suitable housing.
Figure 9:
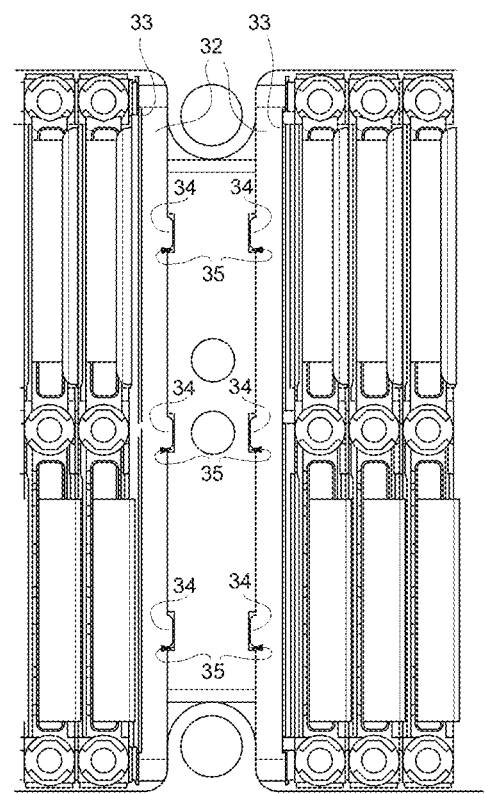
FIG. 9 is a schematic top view of a portion of the battery pack of FIG. 4.
Figure 10:
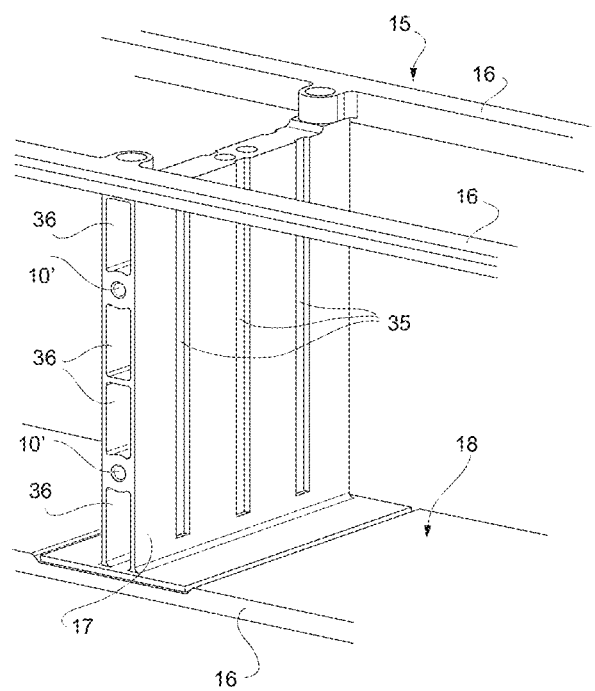
FIG. 10 is a perspective view of a portion of the battery pack of FIG. 4.

In the non-limiting embodiment of FIGS. 6 and 9, each module 12 comprises a plurality of units 19 arranged parallel to one another, at whose ends there are the two insertion plates 32. In particular, between each insertion plate and the cells C, namely the units 19, there are two layers 33 of thermally insulating material. In this way, the temperature remains even along the module, thus preventing the outer cells from dissipating more heat towards the support structure (and the bulkheads 17) compared to the inner cells.

The more even the distribution of the temperature, the longer the life of each cell C. In particular, the insertion plates 32 also help increase the thermal insulation of the module 12.

According to the non-limiting embodiment of the accompanying figures, the battery pack 3 comprises at least one cooling panel 11 arranged in the area of said at least one lateral surface LS and configured to be fixed to the support structure 15 so as to dissipate the heat transmitted by the dissipating elements 20.

In particular, the battery pack 3 comprises two cooling panels 11 arranged on the two opposite lateral surfaces LS. More in particular, the cooling panels 11 are mounted on board the support structure 15, in particular on board the bulkheads 17, by means of fixing elements 10, 10'. The cooling panels 11 being configured to dissipate the heat provided by the dissipating elements 20.

In the non-limiting embodiment of the accompanying figures, the battery pack 3 comprises one single cooling panel 11 for several modules 12, in particular for each lateral surface LS.

Advantageously, though not necessarily, a thermo-convective paste is present between each cooling panel 11 and the respective lateral surface. In this way, the transmission of heat between the projecting portions 21 of the dissipating elements 20 and the cooling panels 11 is further increased.

Alternatively or in addition, advantageously, though not in a limiting manner, the panels 11 are mounted to the support structure 15, in particular to the perimeter elements 16, 17, so as to hermetically seal the lateral surface or surfaces LS. In particular, in order to obtain the aforesaid hermetic seal, a sealing fluid is applied onto the lateral perimeter of the section 7 or onto the perimeter of the panels 11.

In some non-limiting cases, like the one shown in FIGS. 2-4, the battery pack 3 comprises an upper opening, which is hermetically closed by a cover element 9. In particular, the battery pack 3 further comprises at least one removable busbar BB, wherein the busbar BB is the first removable element once the cover element has been removed. In this way, maintenance operations are facilitated, easily cutting current to the control system 8.

In this way, through the closing element 9, the base 18 and the cooling panels 11, a hermetic seal of the battery pack 3 is ensured, in particular an IP67 seal, protecting the cells C from liquids, dusts, fumes present inside the engine compartment 4. Furthermore, advantageously, said hermetic seal allows the air flows inside the battery pack 3 to be adjusted with utmost precision, through the venting valve CC, which becomes an obligated passage. In particular, the bulkheads 17 comprise channels 36 configured to lighten the support structure 15.

In some non-limiting cases, the support structure 15 and/or the bulkheads are made of aluminium or of a composite material (for example, carbon fibre).

Preferably, the bulkheads 17 are configured to connect the frame 16 and the base 17.

Advantageously, though not necessarily, the busbar BB has an elongated shape and runs, under the cover element 9, along the entire length of the section 7, so as to connect the series of cells C to the terminals T of the control system 8. Preferably, the busbar BB comprises, for example at half its length, a current sensor so as to monitor more accurately the flow of current through it and free space inside the section 6.

According to a further aspect of the invention, a control unit 13 is provided, which can be installed in a battery pack 3 comprising at least one module 12 provided with a plurality of electrochemical cells C carried on board a support structure 15 of the vehicle battery pack 3. In particular, the unit 13 can be installed in the battery pack 3 according to the description above.

Advantageously, though not necessarily, the control unit 13 can be installed on board the support structure 15 (in particular, above the terminal poles TT', TT").

Figure 11:
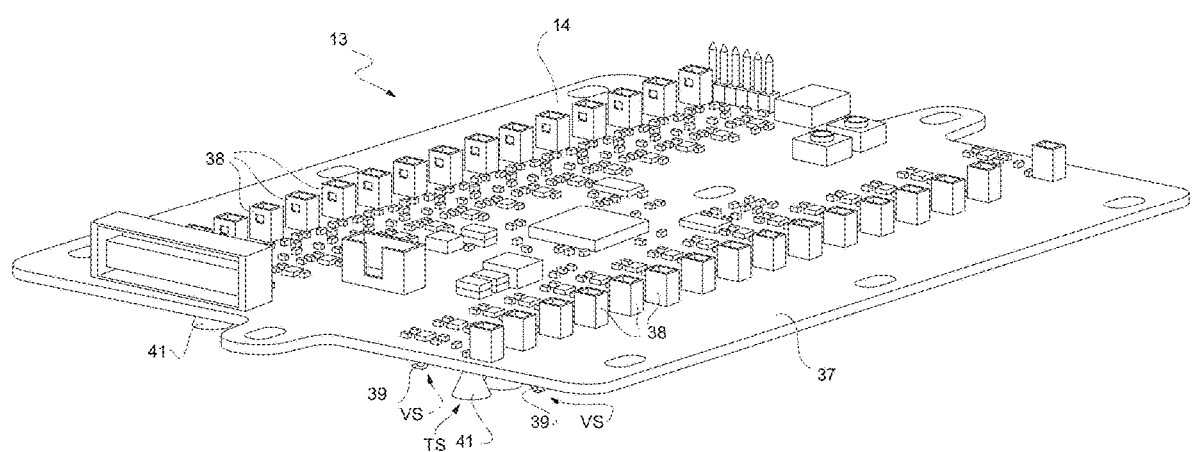
FIG. 11 is a schematic perspective view of a control unit according to the invention from a first angle.
Figure 12:
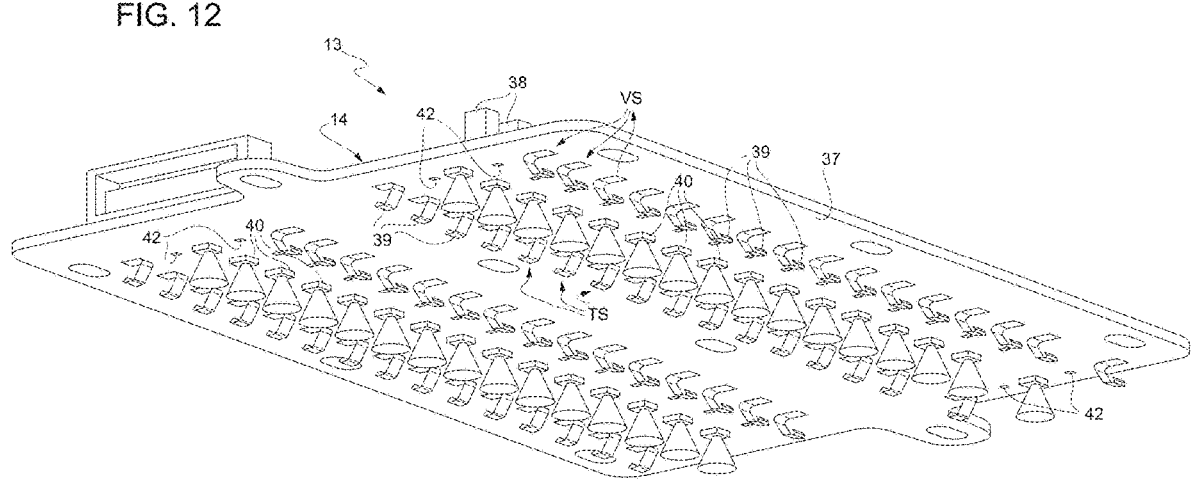
FIG. 12 is a schematic perspective view of a control unit according to the invention from a second angle.
Figure 13:
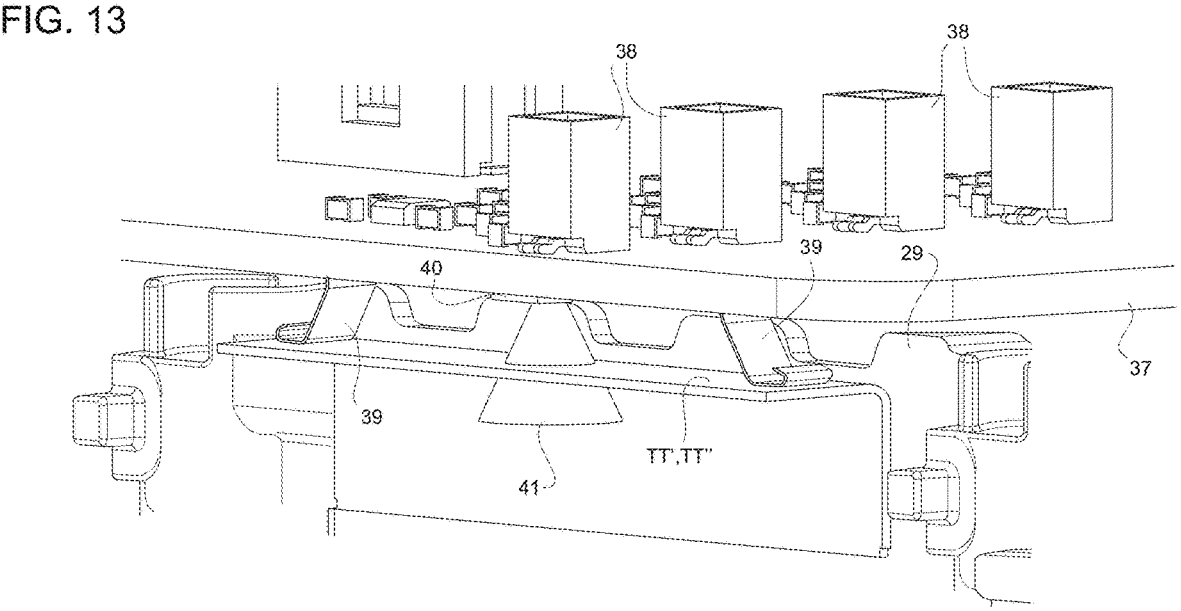
FIG. 13 is a schematic perspective view of a detail of the control unit of FIGS. 11 and 12 when it is installed in the battery pack of FIG. 4.

In the non-limiting embodiment of FIGS. 11-13, the control unit 13 comprises a planar support substrate 37 comprising (made of) an at least partially insulating material (in particular, an insulating material, like normal supports for printed circuit boards). Furthermore, the control unit 13 comprises a plurality of sensor elements 14 configured to control the operating parameters of the electrochemical cells C of the module 12 (voltage, temperature, . . . ).

Advantageously, though not necessarily, at least part of the sensors elements 14 are arranged, on the support substrate 37, in single rows so as to be each positioned, once the unit 13 is installed on board the vehicle battery pack 3, in the area of a respective terminal pole TT', TT" of each electrochemical cell C', C".

In some non-limiting cases, like the one shown in FIGS. 11 to 13, the sensor elements 14 comprise at least one voltage sensing device TS, which comprises at least two conductor and elastically deformable contact elements 39, which are configured to be, in use, elastically compressed between the planar support substrate 37 and the respective terminal pole TT', TT" (FIG. 13), contacting the latter in two different points. In this way, the unit 13 can be installed eliminating the need for a large number of wired connections and facilitating the assembly.

Advantageously, though not necessarily, the contact elements 39 are (entirely) interposed and compressed (squashed) between the planar support substrate 37 and the respective terminal pole TT', TT" (FIG. 13) of each electrochemical cell C', C". In this way, no welds between the contact elements 39 and the terminal poles TT', TT" are needed, thus making the assembly simpler and incredibly quicker. Therefore, in detail, there are no welds between the contact elements 39 and the terminal poles TT', TT".

Hence, in particular, the contact elements 39 extend from the planar substrate 37 (in detail, from a lower face thereof) downwards, contacting the terminal poles TT', TT" and holding the contact through compression.

Advantageously, though not necessarily, the contact elements 39 are V-shaped with two contiguous segments, a first segment being parallel and fixed to the planar substrate 37, whereas a second segment diverges from the planar substrate 37 itself, in particular towards the outside of the terminal pole TT', TT" (FIG. 13).

Advantageously, though not necessarily, each sensor element 14 further comprises a temperature sensor TS configured to detect the temperature in the area of the respective terminal pole TT', TT".

Preferably, the temperature sensors TS are arranged in two single rows.

In some non-limiting cases, the temperature sensor is a wired (and remote) thermistor of the NTC type.

Preferably, the temperature sensor comprises a remote NTC connector 38, to which probes are wired, which are arranged as close as possible to the cell C', C".

Alternatively or in addition, the temperature sensor is a thermistor 42 of the NTC SMD type with a thermal gap, configured to detect the thermal conduction of the respective terminal pole TT', TT".

Advantageously, though not necessarily, the temperature sensor TS is an infrared sensor 40 arranged on board the planar substrate 37 on the same (lower) face as the contact elements (39) and configured to face the respective terminal pole TT', TT", so as to point a respective infrared light beam 41 at it in order to measure the temperature thereof. In particular, the light beam 41 is a beam with a conical shape (FIG. 13). More in particular, the infrared sensor 40 is arranged between the two contact elements 39 associated with the respective terminal pole TT', TT" (in detail, along a same straight line). Preferably, the second segment of the contact elements 39 diverges from the planar substrate 37 in an opposite direction relative to the sensor 40. In this way, the elements 39 follow the conical shape of the light beam 41 and reduce the risk of wrong measurements.

Advantageously, though not necessarily, the battery pack 3 comprises at least one unit 13 for each module 12.

In particular, the units 13 are arranged on a same plane between the terminal poles TT', TT" of the cells C', C" of the units 19 and the closing element 9 (or the busbar BB).

According to a further aspect of the invention, there is provided a road vehicle 1 comprising a battery pack 3 of the type described so far.

According to a further aspect of the invention, there is provided a method to assemble a battery pack 3. The method comprises the steps of:
- providing the support structure 15 described above;
- compressing the module 12 comprising the plurality of planar electrochemical cells C, electrically connected and parallel both to one another and to the bulkheads 17, wherein compression occurs along a direction TD transverse to the planar cells, in particular by applying a compression force CF (FIG. 8);
- inserting the module 12 under compression into the relative housing by applying an insertion force IF in a direction PD transverse (perpendicular) to the compression direction.

In particular, the insertion is accomplished with the aid of the two insertion plates 32 arranged at the ends of the module 12 under compression, parallel to the bulkheads 17, wherein the insertion plates 32 facilitate the insertion of the module 12 under compression into the relative housing, so that compression remains even after insertion. More in particular, the insertion plates 32 are inserted into the relative housing together with the module 12 and remain inside the battery pack 3 even after the insertion.

In detail, it is known, for new-generation batteries, that maintaining a correct pressure of compression of the cells C is crucial to exploit the performances of the cells C and to preserve the functionalities thereof during the charging/discharging cycles. The compression (force CF), which remains after the insertion of the module 12, is a so-called "functional compression", which maintains the cells C of the module 12 within a superficial pressure range and, as it is known, is necessary in order to ensure the correct electrochemical operation of the module 12.

Preferably, the compression remaining after the insertion depends on the type of cells C (for example, lithium-ion, lithium metal, solid-state, etc.) and ranges from 0.5 to 25 bar. In particular, from 0.5 bar to 5 bar for cells C with liquid electrolytes and from 2.5 to 25 bar for solid-state cells C.

Advantageously, though not necessarily, the compression force CF is applied to the insertion plates 32 and/or to portions PE of the supports 27 arranged in the area of the plurality of cells C (and of the units 19), on the opposite side relative to the housing. In particular, the aforesaid portions are arranged between the terminal poles TT', TT" of the plurality of cells C, which are arranged in the two parallel rows.

Advantageously, though not necessarily, the method comprises the further step of applying a sealing fluid along the elongated perimeter elements so as to surround the two opposite lateral surfaces LS of the box portion BP and hermetically seal said lateral surfaces LS with the same number of cooling panels 11 arranged in the area of the lateral surfaces.

In some non-limiting cases, alternatively or in addition, the method comprises the further step of applying a sealing fluid along the elongated perimeter elements in the area of at least one upper opening of the box portion BP and hermetically closing said upper opening with the cover element 9.

According to some preferred non-limiting embodiment, the method further entails installing one or more units 13 according to the description above, so that each sensor element 14 is in the area of a respective terminal pole TT', TT" and so that said at least two conductor and elastically deformable contact elements 39 are elastically compressed between the planar support substrate 37 and the respective terminal pole TT', TT", contacting the latter in two different points.

Even though the invention described above specifically relates to some precise embodiments, it should not be considered as limited to said embodiments, for its scope of protection also includes all those variants, changes or simplifications covered by the appended claims, such as for example a different shape of the battery pack, a different location thereof, a different conformation of the units 19, a different type of materials, etc.

The invention offers many advantages.

First of all, it reduces the overall dimensions and lightens the normal structure of a traditional battery pack, which comprises several concentric housings, one for each module and one for the interconnection between the modules and their positioning inside the frame.

Furthermore, the invention facilitates the assembly of the battery pack, anyway ensuring a sufficient heat dissipation.

A further advantage of the invention lies in the possibility of adjusting the compression inside the housing by changing the thickness of the insertion plates.

In addition, the invention offers a battery pack with an easier maintenance, since the risk of current discharges is reduced, facilitating the removal of the busbar.

Furthermore, the invention allows manufacturers to quickly and easily install the control units 13, eliminating useless wirings and further lightening the structure.

Finally, the invention allows the temperature of the terminal poles of the cells to be monitored without necessarily having to contact them, thus preserving them.

LIST OF THE REFERENCE NUMBERS OF THE FIGS.

1 vehicle
2 frame
3 battery pack
4 engine compartment
5 passenger compartment
6 section
7 section
8 control system
9 cover element
10 fixing elements
11 cooling panels
12 modules
13 control unit
14 sensor elements
15 support structure
16 frame
17 bulkheads
18 base
19 energy unit
20 dissipating element
21 projecting portion
22 channels
23 compensation foam
24 peripheral thermal protection
25 separation film
26 protection film
27 plastic support
28 passage
29 separation
30 fixing means
31 connection plates
32 insertion plates 33 thermal insulator
34 skates
35 seats
36 channels
37 at least partially insulating substrate
38 remote NTC connector
39 contact element
40 infrared sensor
41 beam
42 nTC SMD
BB busbar
BP box portion
C, C', C" cells
CF compression force
CN connectors
IF insertion force
LS lateral surface
PD direction
T terminals
TD direction
TS temperature sensor
TT' terminal pole
TT" terminal pole
VS voltage sensor
VV venting valve
W wheels

The invention claimed is:

1. A control unit (13) for a vehicular battery pack (3) comprising at least one module (12) provided with a plurality of electrochemical (C, C', C") cells supported by a support structure (15) of the vehicular battery pack (3), the control unit (13) being installable on board the support structure (15) of the battery pack and comprising:
a planar support substrate (37) made of an at least partially insulating material;
a plurality of sensor elements (14) configured to control the operating parameters of the electrochemical cells (C, C', C") of the module (12);
wherein at least part of the sensor elements (14) are arranged, on an upper face of the planar support substrate (37) of support, in two single rows so as to be positioned, each, once the unit is installed on board the vehicular battery pack (3), at a respective terminal pole (TT', TT") of each electrochemical cell;
wherein the sensor elements (14) comprise at least one voltage sensing device, which comprises at least two elastically conductive and deformable contact elements (39) arranged on a lower face of the planar support substrate (37) opposite the upper face, which is configured to be, in use, elastically compressed between the lower face of the planar support substrate (37) and the respective terminal pole (TT', TT"), contacting the same at at least one point; and
wherein each of the plurality of sensor elements (14) further comprise a temperature sensor (TS) configured to detect a temperature at a respective terminal pole (TT', TT"), each respective temperature sensor positioned on the lower face of the planar support substrate (37) between two deformable contact elements (39), the temperature sensor (TS) comprising an infrared sensor configured to emit a respective infrared light beam (41), the respective two deformable contact elements (39) being deformed to diverge from the planar support substrate (37) in opposite directions of the infrared light beam (41).

2. The control unit according to claim 1, wherein the contacting elements (39) are V-shaped conformed by two contiguous segments, of which a first segment is parallel and fixed to the planar substrate (37), while a second segment diverges from the planar substrate (37) itself.

3. The control unit according to claim 1, wherein the temperature sensor (TS) further comprises a wired thermistor of the NTC type.

4. The control unit according to claim 1, wherein the temperature sensor (TS) further comprises a thermistor of the NTC SMD type with a thermal gap, configured to detect thermal conduction of the respective pole.

5. The control unit according to claim 1, wherein the temperature sensor (TS) is configured to face the respective pole (TT', TT"), so as to point the respective infrared light beam (41) at it to measure its temperature.

6. A vehicular battery pack (3) comprising:
a support structure (15) comprising in turn at least two elongated and facing perimeter members (16, 18) defining between them a box portion (BP);
one or more bulkheads (17) arranged to subdivide the box portion (BP) by delimiting at least two housings, wherein the one or more bulkheads (17) are arranged transversely to the two facing perimeter elements (16, 18);
a plurality of planar electrochemical cells (C, C', C"), electrically connected and parallel to each other as well as to the one or more bulkheads (17) and subdivided into at least two modules (12); and
at least one control unit (13) according to claim 1.

7. The vehicular battery pack (3) according to claim 6, wherein the at least two modules (12) comprise, each, at least two insertion plates (32) arranged at the ends of each module (12), parallel to the one or more bulkheads (17), and configured to facilitate insertion of each module (12) in compression within the corresponding housing, such that the compression remains even after the insertion.

8. The vehicular battery pack (3) according to claim 6, wherein each insertion plate is in contact with a respective bulkhead, and wherein the coefficient of static sliding friction between each plate and the respective bulkhead is less than 0.3; the insertion plates (32) being configured also to adjust the compression within of the housing, compensating for any imperfections of the plurality of cells (C, C', C"); the plates (32) of insertion comprising mainly polytetrafluoroethylene.

9. The vehicular battery pack (3) according to claim 6, comprising a plurality of dissipating elements, arranged between the cells (C, C', C") and configured to transfer heat to two opposite lateral surfaces of the (BP) box portion wherein each dissipating element (20) comprises two opposite projecting portions, in particular parallel portions, which, together with those of the other dissipating elements, define the two opposite lateral surfaces.

10. The vehicular battery pack (3) according to claim 9 and comprising two one cooling panels (11), arranged, respectively, at the two lateral surfaces (LS) and configured to be fixed to the support structure (15) so as to dissipate the heat transmitted by the dissipating elements; wherein the plates are mounted to the support structure (15), in particular to the perimeter elements (16, 18), so as to hermetically seal the two lateral surfaces.

11. The vehicular battery pack (3) according to claim 6, and comprising an upper opening, hermetically closed by a cover element (9), the battery pack (3) further comprising at least one removable busbar (BB), wherein the busbar (BB) is the first removable element once the cover element (9) has been removed.

12. The vehicular battery pack (3) according to claim 11, and comprising a unit according to claim 1 for each module (12); wherein said units are arranged between the respective module (12) and the cover element (9); in particular between the respective module (12) and the busbar (BB).

13. A road vehicle (1) comprising a battery pack (3) according to claim 1; the battery pack (3) arranged transversely to a longitudinal direction of the vehicle (1); the battery pack (3) being mounted to a vehicular frame (2) posteriorly to a vehicular passenger compartment (5).

14. An assembly method for a battery pack (3) comprising the steps of:
- providing a support structure (15) comprising in turn at least two elongate and facing perimeter members (16, 18) defining between them a box portion (BP); and one or more bulkheads (17) arranged to subdivide the (BP) box portion by delimiting at least one housing, wherein the one or more bulkheads (17) are arranged transversely to the two facing perimeter members (16, 18);
- compressing at least one module (12) comprising a plurality of planar electrochemical cells (C, C', C"), electrically connected and parallel to each other as well as to the one or more bulkheads (17), wherein compression occurs along a direction transverse to the planar cells (C, C', C");
- inserting the module (12) in compression inside the relevant housing by applying an insertion force (IF) in a direction transverse to the direction of compression; wherein insertion is accomplished with the aid of two insertion plates (32) arranged at the ends of the module (12) in compression, parallel to the one or more bulkheads (17), wherein the insertion plates (32) facilitate insertion of the module (12) in compression inside the relevant housing, so that compression remains even after insertion;
- installing a control unit (13) according to claim 1 so that each sensor element is at a respective pole and so that the at least two conductive and elastically deformable contact elements (39) are elastically compressed between the planar support substrate (37) and the respective pole (TT', TT") end, contacting the same at two different points.

* * * * *